O. P. WILLIAMS.
VERTICAL CUTTER BAR ATTACHMENT FOR HARVESTERS.
APPLICATION FILED JULY 25, 1919.
1,336,267.
Patented Apr. 6, 1920.
2 SHEETS—SHEET 1.
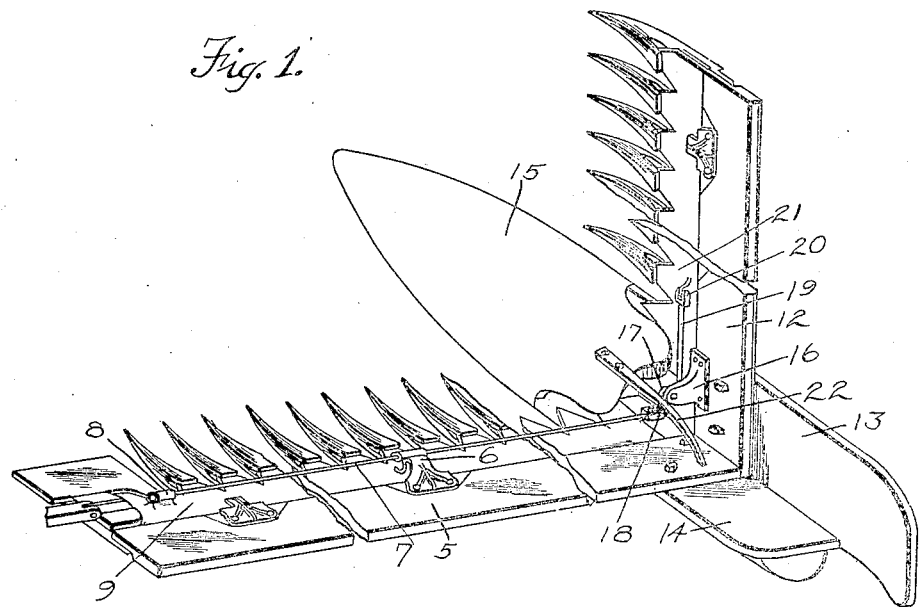
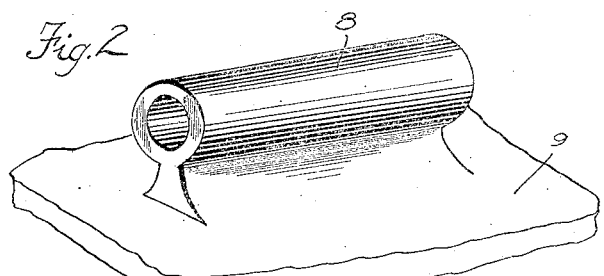
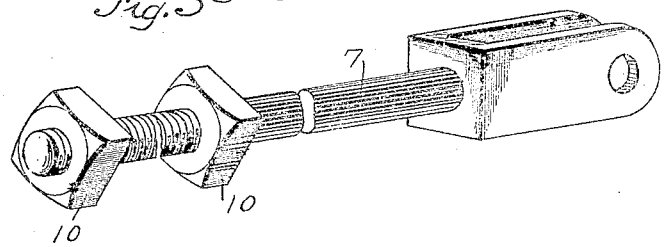
WITNESSES
INVENTOR
O. P. WILLIAMS,
BY
ATTORNEYS O. P. WILLIAMS.
VERTICAL CUTTER BAR ATTACHMENT FOR HARVESTERS.
APPLICATION FILED JULY 25, 1919.
1,336,267.
Patented Apr. 6, 1920.
2 SHEETS—SHEET 2.
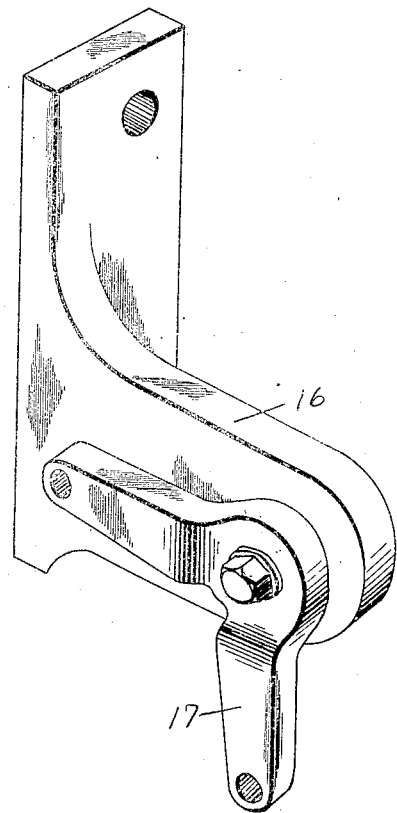
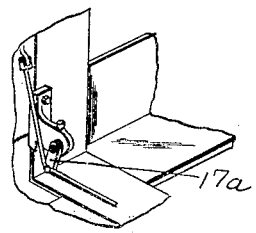
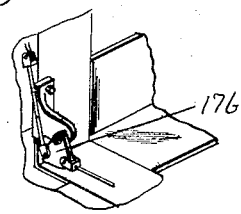
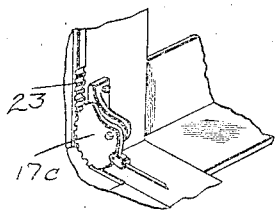
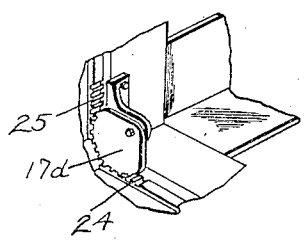
INVENTOR
O. P. WILLIAMS
BY
ATTORNEYS

UNITED STATES PATENT OFFICE.

ORMSBY P. WILLIAMS, OF TROUT LAKE, WASHINGTON.

VERTICAL CUTTER-BAR ATTACHMENT FOR HARVESTERS.

1,336,267.   Specification of Letters Patent.   Patented Apr. 6, 1920.

Application filed July 25, 1919. Serial No. 313,134.

*To all whom it may concern:*

Be it known that I, ORMSBY P. WILLIAMS, a citizen of the United States, and a resident of Trout Lake, in the county of Klickitat and State of Washington, have made certain new and useful Improvements in Vertical Cutter-Bar Attachments for Harvesters, of which the following is a specification.

This invention is an improvement in cutting bar attachment for harvesting machines, such as mowing machines, grain binders, harvesters, etc.

The principal object of the invention is to provide a vertical cutting bar to operate in unison with the horizontal cutting bar whereby tangled and down hay may be cut loose whereby to permit the driver to see where the cut had been made on his next trip around.

Another object is to provide novel means for transmitting the motion from the horizontal to the vertical knife.

A further object is to provide an improved attachment of the nature set forth, which will be extremely simple, durable, efficient in operation, and inexpensive to manufacture and maintain.

With these and other objects in view which will become apparent as the description proceeds, the invention resides in the construction, combination and arrangement of parts hereinafter more fully described and claimed and illustrated in the accompanying drawings, in which like characters of reference indicate like parts throughout the several figures, of which:

Figure 1 represents a view in perspective of the cutting bar of a harvester showing my invention in place thereon;

Fig. 2 represents a view in perspective of a fragment of the horizontal knife showing the bearing for the outer end of the operating rod;

Fig. 3 represents a view in perspective of the connecting rod for driving the vertical knife;

Fig. 4 represents a view in perspective of the bracket for supporting the bell crank between the operating rod and the connecting rod, and, Figs. 5, 6, 7 and 8 represent views in perspective of some of the different means of communicating motion from the operating rod to the connecting rod.

In carrying out my invention I provide the sickle bar 5 with a central bearing 6 for slidably supporting the operating rod 7. The latter at its inner end is threaded and extends through a bearing 8 formed integrally with or suitably secured to the head of the horizontal knife 9. Nuts 10 threaded on the end of the rod 7 are turned up against the ends of the bearing 8, and thus adjustably secure the rod to the bearing.

A vertical bar 12 is placed at the outer end of the bar 5, and a shoe 13 is arranged at the meeting ends of the bars. The ends of the bars are bolted or otherwise secured to the vertical and horizontal walls 13 and 14 respectively of the shoe. The shoe as shown in Fig. 1 is substantially L-shaped in cross section, tapering to a point at its forward end, and is provided forwardly of the bars with an apron or cowl 15.

Adjacent the lower end of the vertical bar 12 is secured a bracket 16, which supports a bell crank 17 to one arm of which the outer end of the rod 7 is pivotally connected as at 18. The other arm of the bell crank is pivotally connected to the lower end of the connecting rod 19. The latter is relatively short in length and at its upper end is pivotally connected as at 20 to the vertical knife 21 carried by the vertical bar 12. The motion of the horizontal knife 9 is thus transmitted through the rod 7, bell crank 17 and connecting rod 19 to the vertical knife 21. A guard in the shape of a finger 22 attached to the cowl of the shoe and overlying the bell crank preventing the hay or grain being cut from becoming entangled in the mechanism and thereby interfering with the action of the vertical blade.

I may substitute other means for the bell crank for transmitting motion from the rod 7 to the rod 19. Some of these means are illustrated in Figs. 5, 6, 7 and 8. In Fig. 5 for instance, a link 17$^a$ is pivoted at one end to the bracket. The other end of the link is connected by a common pivot to the adjacent ends of the rods.

In the construction shown in Fig. 6 I substitute a triangular plate 17$^b$ for the bell crank, this plate being pivoted at one corner to the bracket, and at its other corner to the operating and connecting rods respectively.

In Fig. 7, I pivot a gear segment 17$^c$ to the bracket, and pivot the outer end of the operating rod to the segment. In this construction the lower end of the connecting rod is in the shape of a rack 23, meshing with the gear segment.

In Fig. 8 a gear segment 17ᵈ is used, and the adjacent ends of the operating rod and the connecting rod are formed with racks as at 24, and 25, respectively, meshing with the segment.

Although I have described the preferred embodiments of my invention I may make such changes in the construction, combination and arrangement of parts thereof as do not depart from the spirit of the invention and the scope of the appended claim.

I claim:—

The combination with a horizontal cutter bar having a moving knife, of a vertical cutter bar arranged at one end of the horizontal bar and having a moving knife, a shoe formed of right angularly extending plates to which said bars are secured, a guide bracket on said horizontal bar, an operating rod slidable through said bracket and having one end threaded, a tubular member on said horizontal knife through which said threaded end extends, nuts on said threaded end engaging opposite ends of said tubular member whereby said operating rod is adjustably connected with the horizontal knife, a bracket on said vertical bar, an angle lever pivoted on said last named bracket and having one arm connected with said operating rod, and a connecting rod pivotally connected with said vertical knife and with the other arm of said angle lever.

ORMSBY P. WILLIAMS.